United States Patent [11] 3,592,065

| [72] | Inventor | Ludwig Seydelmann<br>Holderlinstrasse 9, 7 Stuttgart, Germany |
|---|---|---|
| [21] | Appl. No. | 748,096 |
| [22] | Filed | July 26, 1968 |
| [45] | Patented | July 13, 1971 |
| [32] | Priority | July 31, 1967 |
| [33] | | Germany |
| [31] | | P 16 48 695.6 |

[54] ASSEMBLING AND BALANCING DEVICE FOR A SET OF TOOLS
10 Claims, 5 Drawing Figs.

[52] U.S. Cl. .................................................. 73/483, 146/67
[51] Int. Cl. ........................................................ G01m 1/12
[50] Field of Search ............................................ 73/483-6; 146/67

[56] References Cited
UNITED STATES PATENTS

| 2,265,897 | 12/1941 | Ghetto | 73/483 |
| 2,679,751 | 6/1954 | Pfeiffer | 73/484 |
| 2,698,537 | 1/1955 | Taylor et al. | 73/486 |
| 2,854,045 | 9/1958 | Schmidt et al. | 146/67 |
| 2,905,217 | 9/1959 | Schmidt, Jr. | 146/67 |
| 3,039,314 | 6/1962 | Smith | 73/455 |
| 3,330,317 | 7/1967 | Schaller | 147/67 |

Primary Examiner—James J. Gill
Assistant Examiner—Herbert Goldstein
Attorney—Karl F. Ross ABSTRACT: A pair of symmetrically opposite blades for a meat cutter are temporarily assembled on a hub which is universally swivelable on a baseplate having abutments for locating the free ends of the blades; the hub passes through elongated cutouts in the blade shanks which are thus radially adjustable to their proper length as determined by these abutments. Upon such adjustment, two relatively rotatable and eccentrically weighted clamping rings are turned until the assembly is balanced on the hub axis, the rings being then immobilized with reference to the blades whereupon the entire assembly is removed from the hub for mounting on the drive shaft of the meat cutter.

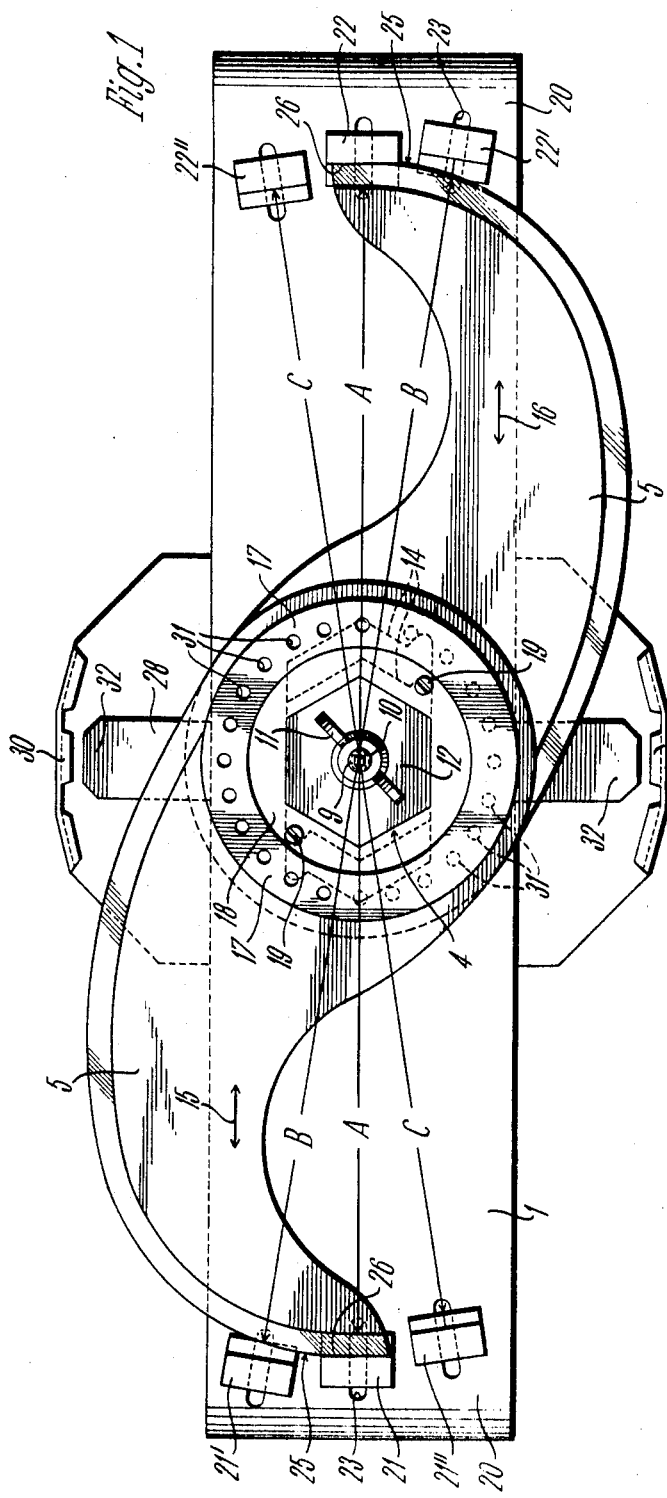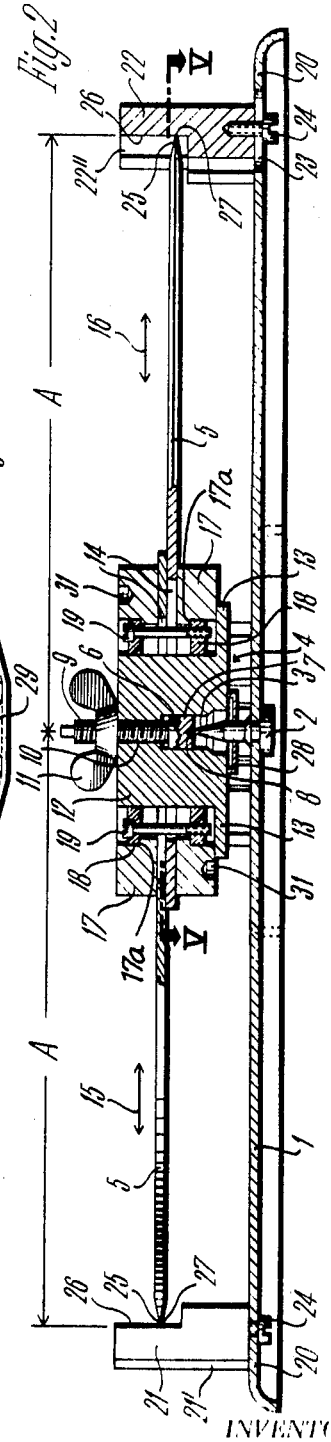
INVENTOR
Ludwig Seydelmann
BY
Karl G. Ross
Attorney

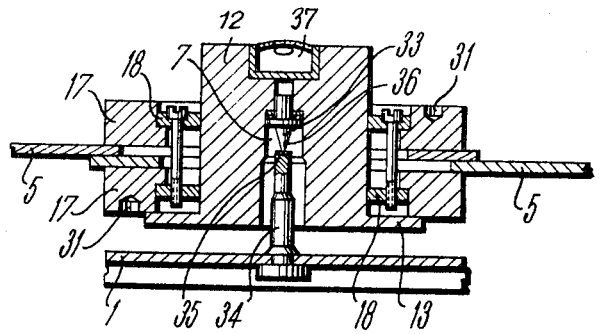
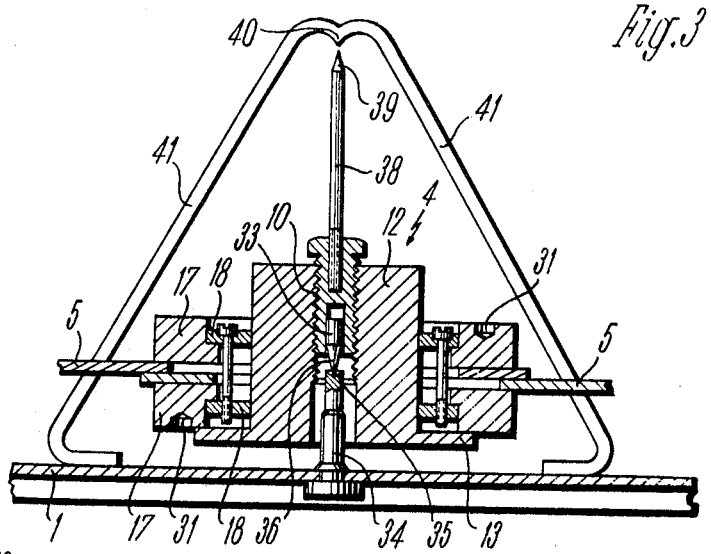
Fig.3
Fig.4
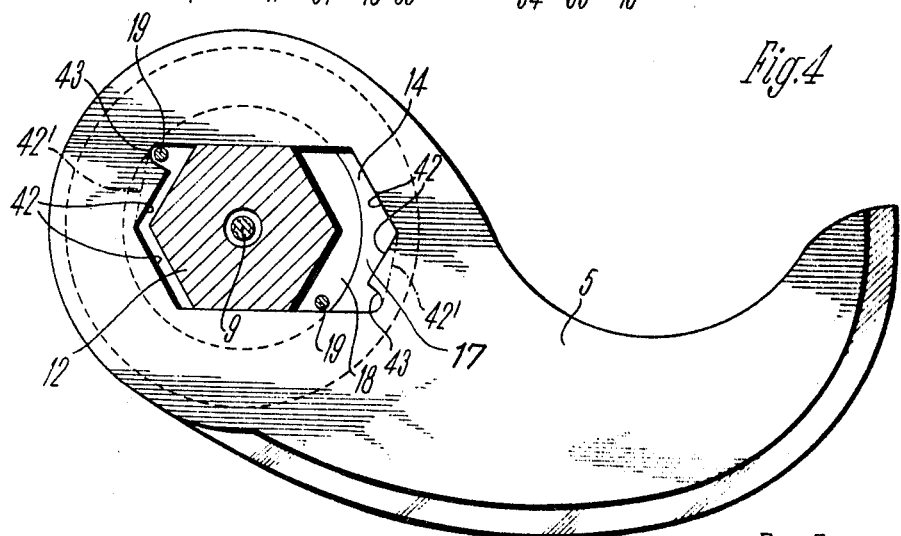
Fig.5
INVENTOR:
Ludwig Seydelmann
BY
Karl F. Ross
ATTORNEY

ASSEMBLING AND BALANCING DEVICE FOR A SET OF TOOLS

The present invention relates to a device for assembling and balancing several tools which are combined with each other so as to form an axially symmetrical set of tools, for example, a set of blades for a meat cutter or similar machine, which revolve about a common axis and project substantially radially therefrom.

For rotating at a high rate of speed a number of tools which are combined so as to form an axially symmetrical set and which project radially or substantially radially from a common shaft, it is necessary to balance the masses of the individual tools relative to each other as accurately as possible since otherwise the bearings as well as other important components of the machine in which these tools are used will soon be damaged and the vibrations which will then occur will irritate or may even be harmful to the operator of such a machine. Since the individual tools of such a machine will gradually become worn and their cutting edges or the like, for example, those of the blades of a meat cutter, must then be reground or refinished, it becomes necessary to readjust the individual tools and to balance them accurately relative to each other. If there is no skilled personnel available for carrying out this adjusting and/or balancing operation, this work will require considerable time and will therefore be very expensive. Furthermore, such manual adjustments can seldom be carried out so accurately that the machine will run as smoothly and steadily as required and so that the tools thereof will produce an output as high and of the quality as desired.

It is an object of the present invention to provide a device for assembling and balancing the individual tools of each set other as accurately as desired within a very short time and by very simple means and a very simple procedure which may also be carried out by unskilled personnel.

For attaining this object, the present invention provides a setting and balancing device which comprises a supporting element or hub universally swivelable on a baseplate or the like, and connecting means which rest on this supporting element and secure the individual tools of one set to one another in such a manner that they are axially symmetrical and rotatable about a common axis. The device according to the invention is based upon the principle that a set of tools which is supported at its axis of rotation will always be properly balanced if the common center of gravity of this set is located on the central vertical axis of the assembling with the set of tools disposed within a horizontal plane.

The radial adjustment of the individual tools of each set relative to one another and thus the adaptation of these tools to the geometrical shape of the work chamber of the machine in which they are to be employed may be considerably simplified, for example, by providing at least one and preferably several limit markings, limit blocks or similar abutments on the baseplate of the device at a predetermined lateral distance from the central axis of the connecting means. This distance should then always correspond to the desired distance between the outer edge of each tool and its axis of rotation. The individual limit blocks which preferably are adjustable to different distances from the center of the connecting means may also be provided with pointers or the like at the level where the outer edges of the tools should be located so as to permit an accurate adjustment of the tools.

In order to determine whether the tool set might be inclined in the transverse direction and to permit such an inclination to be eliminated, it is further advisable according to the invention to provide the connecting means with at least one pointer or the like which extends transversely to the longitudinal direction of a tool and is associated with a fixed pointer or marking on a part connected to the baseplate.

The connecting means for the tools of each set may consist of a central hublike member or core which has an annular flange on its lower end and is pivotally mounted on the supporting element so as to be able to oscillate together with the tools in different directions and of clamping means, e.g. a pair of relatively rotatable rings which clamp the tools of the set together and are removably connected to the hublike member while resting on the annular flange of the latter and thus supporting the set of tools thereon. By the use of such relatively rotatable clamping rings, each with a center of gravity offset from the common axis of the hublike member and the supporting element on which the hublike member together with the set of tools is pivotable, the masses of the tools may be balanced very accurately simply by turning the two clamping rings to different positions relative to each other, and to the tools, until the central axis of the assembly or stack formed by the tool shanks and their clamping rings is exactly vertical as determined by a spirit level or similar plumb indicators.

The features and advantages of the present invention will become more clearly apparent from the following detailed description thereof given with reference to the accompanying drawing in which:

FIG. 1 shows a top view of a setting and balancing device according to the invention which is especially designed for adjusting the blades of a meat cutter or similar machine;

FIG. 2 shows, partly in cross section, a side view of this device;

FIGS. 3 and 4 show parts of two modifications of the device according to FIGS. 1 and 2; while FIG. 5 shows a cross section which is taken along the line V—V of FIG. 2.

As shown particularly in FIGS. 1 and 2 of the drawing, the device according to the invention comprises a baseplate 1 in the center of which a tapered pivot pin 2 is mounted which swivelably carries on its pointed tip 3 a hub 4 serving as a temporary support for a group of tools which in this case consist of two cutter blades 5, e.g. opposite halves, of a meat cutter. Pivot pin 2 engages for this purpose in a central bore 7 in the tiltable hub 4 in which a vertically adjustable bearing member 6 is slidable whose lower end has a central conically pointed recess 8. This bearing member 6 forms the head of a setscrew 9 whose shank is screwed into a thread 10 in the central bore 7 and which may be locked in its adjusted position by a wing nut 11.

As illustrated in FIGS. 1 and 2, the upper part 12 of the hub 4 has a hexagonal shape and its lower part forms an annular flange 13. The hexagonal part 12 extends through elongated cutouts 14 in the two cutter blades 5 and thus prevents these two blades from turning relative to each other and to the hub 4. Owing to the hexagonal shape of these cutouts 14 it is possible to shift the two blades 5 relative to each other in the direction of the arrows 15 and 16. These two blades 5 are further interconnected by a pair of clamping rings 17 which, in turn, are clamped together by clamping retaining rings 18 and screws 19 passing through the rings 18 the latter fitting closely on hub 4 and bearing axially upon internal shoulders 17a of rings 17. The lower ring 17 of the removable tool assembly consisting of the two blades 5, the two retaining rings 17 and the two clamping rings 18 rests flat on the flange 13.

Near each end 20, base plate 1 carries three limit blocks 21, 21', 21", and 22, 22', 22" which are adjustable for varying their distance A, B, C from the vertical axis of pivot pin 2 and which may be secured in their adjusted position to the baseplate 1 by means of screws 24 extending through slots 23 in the baseplate. These limit blocks 21, 21', 21" and 22, 22', 22", which form diametrically opposite pairs, are stepped as shown in FIG. 2. The surfaces 26 of these limit blocks confronting the cutting edges 25 of the two blades 5 are shaped to conform to the swingable blade edges 25 and are each further provided with a height marking 27 in accordance with the intended position of the respective blade edge 25.

The lower side of the hub 4 is further provided with a pair of opposite transverse pointers 28 associated with opposite stationary markers 29 and 30 which are connected to the baseplate 1.

When the tool set consisting of the two cutter blades 5 is to be adjusted and balanced, the two blades 5 are at first clamped together to such an extent by means of the two clamping rings 17, the retaining rings 18, and the screws 19 that the two blades are still slidable relative to each other in the direction of the arrows 15 and 16. The tool set thus preassembled is then placed upon the hub 4 so that the lower clamping ring 17 rests flat on the flange 13 of the hub. When the hub 4 together with the tool set is then placed upon the tip of the pivot pin 2, the two blades 5 are pulled outwardly until their cutting edges 25 abut against the opposite surfaces 26 of the two limit blocks 21 and 22. When this has been done, the two cutting edges 25 are spaced at the predetermined distance A from the axis of rotation of the tool set which corresponds to the axis of the pivot pin 2 so that the blades 5 may then be locked relative to each other by tightening the screws 19.

Since the cutting edges 25 of the blades 5 may be unequally ground so that one cutting edge may be ground off more than the other with the result that the centers of gravity of the two blades may be located at different distances from the axis of pivot pin 2, it is further necessary to balance the masses of the cutter blades. For this purpose, each of the two clamping rings 17 is provided along approximately one half of its circumference with weight-reducing bores 31. For properly balancing the masses of the two blades, the two eccentrically loaded clamping rings 17 are then relatively rotated until the two blades of the tool set are located exactly within a horizontal plane and their cutting edges 25 are exactly opposite the markings 27 in the surfaces 26 of the limit blocks 21 and 22. When carrying out this balancing operation, it is further necessary to check that the tool set will be accurately adjusted to a horizontal position also in its transverse direction, as indicated by the transverse pointers 28 and the position of their ends 32 opposite the fixed markers 29 and 30.

Usually, the entire tool set of a meat cutter consists of several, e.g. three, individual blade groups which are axially juxtaposed on the cutter shaft. With the planes of rotation of the individual blade groups mutually parallel and axially spaced apart, it is necessary for attaining the highest possible cutting output in view of the geometrical shape of the inner surface of the cutter bowl to adjust each of the several groups so that its orbital radius, i.e. the distance between the axis of the cutter shaft and the outermost cutting edges 25 of each group, differs from the orbital radius, i.e. of the other blade group. Thus, for example, the distance A indicated in FIG. 1 only applies to the central blade pair, while the distances B and C between the axis of pivot pin 2 and the limit blocks 21' and 22' or the limit blocks 21" and 22" are applicable for the adjustments of the two outer blade pairs flanking the central pair.

From the above description it is evident that the device according to the invention permits the individual blade sets of a cutter to be very accurately and quickly adjusted as well as balanced, which may even be done while the blades of an adjoining pair are being ground so that the period required during which the machine cannot be used may be substantially reduced. If the device according to the invention is supplied together with the associated machine, for example, a meat cutter, the limit blocks 21 and 22 are preferably preadjusted by the manufacturer so that their distances A, B, and C from the axis of pivot pin 2 comply with the geometrical shape of the cutter bowl.

FIG. 3 illustrates a modification of the hub 4 with a counter-bearing 33, which is inserted into the central bore 7 and may also be vertically adjustable, in the form of a pivot pin with a pointed lower end, the opposite bearing member consisting of a fixed stud 34 which is secured to the baseplate 1 and projects into the central bore 7. In its upper end surface, this stud 34 has a conical recess 35 in which the pointed end 36 of pivot pin 33 engages. The upper part 12 of the hub 4 is further provided with a recess containing a spirit level 37 or the like which indicates without any pointers or the like whether the tool set 5 resting on the hub 4 is located accurately within a horizontal plane.

Another modification of the hub 4 similar to that according to FIG. 3 is illustrated in FIG. 4. In place of the spirit level 37, the upper part of the hub is provided with a vertically projecting pointer 38 whose tip 39 coacts with a fixed pointer 38 on brackets 41 which are secured to the baseplate 1.

FIG. 5 finally shows a partial cross section which is taken along the line V–V of FIG. 2 and illustrates more clearly the particular shape of the elongated cutouts 14 in the cutter blades 5 which are adapted to receive the hexagonal upper part 12 of the hub 4. In order to permit the blades 5 to be pulled outwardly until the lateral edges 42 of the cutouts 14 abut against the hexagonal part 12 despite the screws 19 which extend through the holes 14, the diagonally opposite corners of these cutouts are recessed at 43 to receive the screws 19. These recesses or notches 43 may also be enlarged in the manner indicated in FIG. 5 in dot-and-dash lines 42', i.e. by cutting across the adjoining triangular edges.

The device according to the invention permits the entire blade unit, consisting of the individual blade sets, to be balanced not only statically but at the same time also dynamically. This simultaneous balancing of the blade unit occurs automatically inasmuch as the rotating blade unit forms a revolving blade cylinder which during the balancing operation is divided into individual discs i.e., the individual blade sets, and is statically balanced on the device according to the invention. When the individual blade sets are then again combined, with their properly adjusted clamping rings 17 and their retaining rings 18, to form a blade unit adapted to be mounted on the drive shaft of a meat cutter, this entire unit has also been balanced dynamically.

Although my invention has been illustrated and described with reference to the preferred embodiments thereof, I wish to have it understood that it is in no way limited to the details of such embodiments but is capable of numerous modifications within the scope of the appended claims.

Having thus fully disclosed my invention, I claim:

1. A device for assembling a set of symmetrically positioned tools into a balanced unit, said tools being provided with shanks having cutouts for mounting same on a drive shaft of a machine, comprising:

a hub receivable in said cutouts with limited radial mobility of the tools relative to the hub axis;

clamping means removably supported on said hub for engagement with said shanks, said clamping means being movable on said hub into different positions of unbalance relative to said shanks for compensating any unbalance of said tools;

supporting means tiltably engaging said hub; axis indicator means for showing deviations of said hub axis from the vertical; and mounting means alternately engageable with said hub and said drive shaft for entering same with reference to said clamping means and, upon engagement with said hub, for immobilizing said clamping means on said shanks in a position in which deviations are zero, said mounting means thereupon constituting with said clamping means and said tools a balanced unit bodily transferable from said hub to said shaft.

2. A device as defined in claim 1 wherein said supporting means comprises a base provided with abutments positioned symmetrically with reference to said base for engagement with the free ends of said tools.

3. A device as defined in claim 2 wherein said supporting means further comprises a bearing pin enabling universal swiveling of said hub.

4. A device as defined in claim 1 wherein said clamping means comprises a pair of relatively movable elements each having a center of gravity offset from said hub axis.

5. A device as defined in claim 4 wherein said elements are a pair of clamping rings rotatably centered on said hub axis and traversed by said hub.

6. A device as defined in claim 5 wherein each of said clamping rings is divided into two halves of different weight.

7. A device as defined in claim 6 wherein one of said halves is perforated.

8 A device as defined in claim 4 wherein said mounting means comprises a pair of retaining rings fitting closely onto said hub and bearing axially upon said clamping rings.

9. A device as defined in claim 8 wherein said clamping rings are provided with internal shoulders in contact with said retaining rings, said mounting means further including screw means tightenable to press said retaining rings against said shoulders upon rotation of said rings into a balancing position.

10. A device as defined in claim 9 wherein said screw means includes a pair of bolts axially traversing said cutouts on opposite sides of said hub, said bolts being receivable in notches of said shanks at the ends of said cutouts.